United States Patent

McPherson

[15] 3,691,994

[45] Sept. 19, 1972

[54] FLOATING FISH ENCLOSURE

[72] Inventor: Bill N. McPherson, Littleton, Mass.

[73] Assignee: Aqua-Genetics Inc., Concord, Mass.

[22] Filed: May 6, 1971

[21] Appl. No.: 140,787

[52] U.S. Cl. .................................................. 119/3
[51] Int. Cl. ............................................ A01k 61/00
[58] Field of Search ........................... 119/3, 5, 2, 1

[56] References Cited

UNITED STATES PATENTS

| | | | |
|---|---|---|---|
| 3,240,186 | 3/1966 | Dobell | 119/1 |
| 3,402,506 | 9/1968 | Renfro | 119/3 X |
| 3,473,509 | 10/1969 | Miyamura | 119/2 |
| 3,566,839 | 3/1971 | Hilble | 119/3 |

*Primary Examiner*—Aldrich F. Medbery
*Attorney*—Russell & Nields

[57] ABSTRACT

A plurality of porous enclosures are provided to segregate groups of fish for testing and commercial purposes. The enclosure mesh is small enough to retain the fish, yet large enough to permit water flow. The enclosures are arranged circle fashion about a central shaft imbedded in the pond floor, and held in place between two concentric rings by a shaped support frame engaged at either end by the rings. A rotational sleeve sits about the shaft and is joined to the rings by spoke-like members, and flotation elements are provided for the ring-sleeve structure. The assembly is regularly rotated around the shaft, so that the fish within the different enclosures are kept segregated yet exposed to the same environment.

4 Claims, 3 Drawing Figures

FIG. I

INVENTOR
WILLIAM N. McPHERSON

INVENTOR
WILLIAM N. McPHERSON

BY Russell & Nields

ATTORNEYS

FLOATING FISH ENCLOSURE

BACKGROUND OF THE INVENTION

1. Field of the Invention

This invention relates to fish enclosures, and more particularly to enclosures for segregating fish in a fish pond.

2. Description of the Prior Art

Domestically hatched fish may be left in controlled hatching troughs for initial development, but after a period of time, which for catfish is usually about a fortnight, must be transferred to an outdoor pond for continued survival. A considerable problem is encountered in adequately segretating groups of fish once they are transferred to the pond, although segregation is essential for various research, nutritional testing and pedigree development programs as well as for commercial purposes. The usual method has been to separate the different groups into a number of porous dumster-type cages immersed in a line along the side of the pond. Physical segregation is thereby achieved, but each cage is subject to a somewhat different aquatic environment in terms of sunlight, plant life, oxygen level, etc. owing to their separate locations. The effect has been to introduce an element of uncertainty into testing programs and commercial procedures, leaving doubt as to whether differences among fish groups stem from controlled parameter inputs of from uncontrolled environmental influences.

SUMMARY OF THE INVENTION

The present invention has an over-all object the provision of fish enclosures that will simultaneously segregate different groups of fish yet prevent disruptive environmental differences. In the accomplishment of this and other more specific objects that will become apparent from a reading of the specification, a plurality of wire mesh fish cages are provided from mesh large enough to permit the easy passage of water, yet small enough to retain the fish therein. The cages are attached to shaped frames, which in turn are supported between two concentric rings. The rings are maintained in a position about a central shaft by connecting spoke-like cross arms radiating out from a sleeve rotationally fitted onto the shaft. Flotation blocks are placed under the cross arms to keep the rings and cages up. Significant environmental differences are eliminated by rotating the rings and hence the cages around the shaft several times a day.

DETAILED DESCRIPTION OF THE INVENTION

Figure 1:
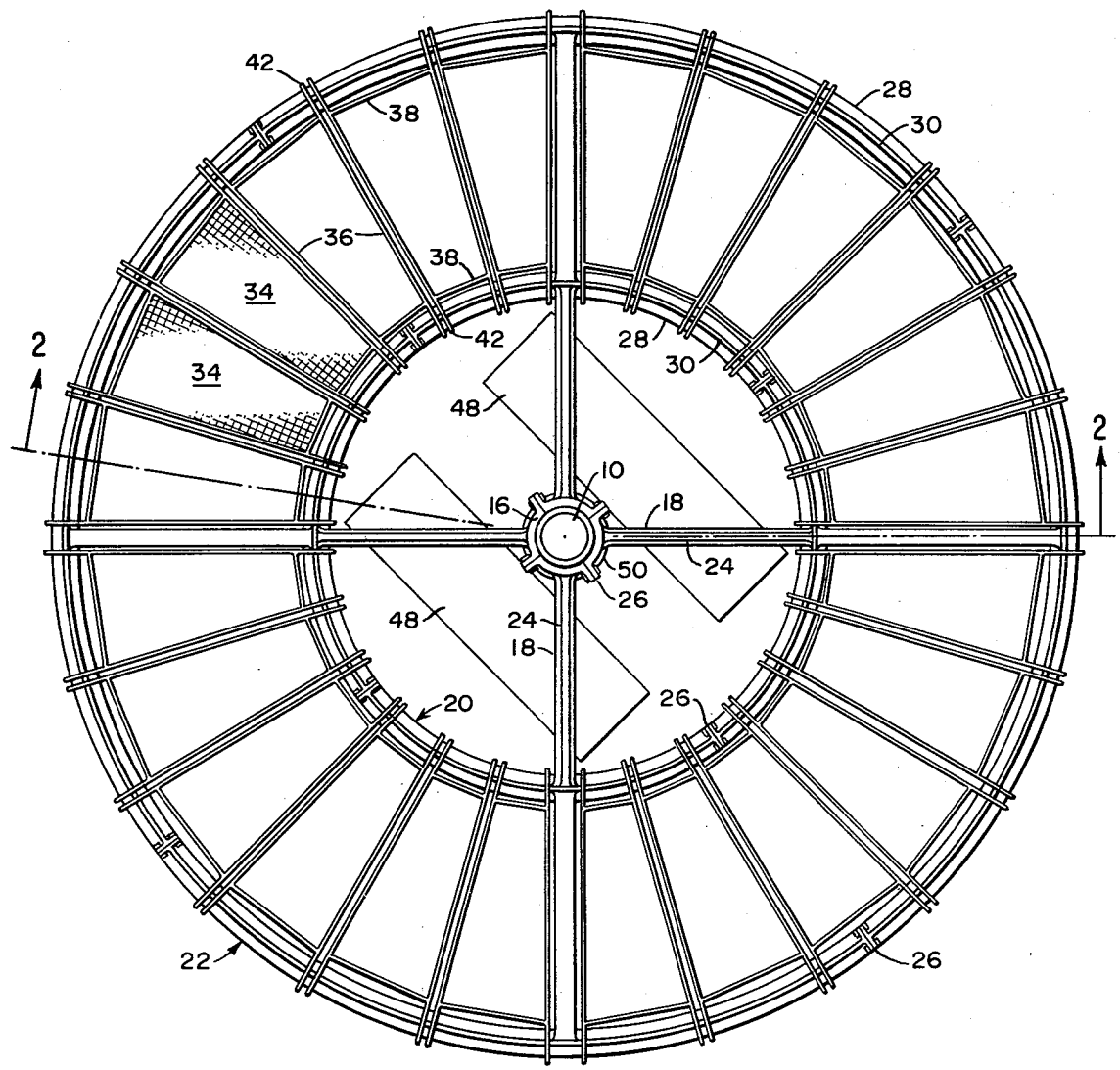
FIG. 1 is a plan view of the improved fish enclosure system of this invention.
Figure 2:
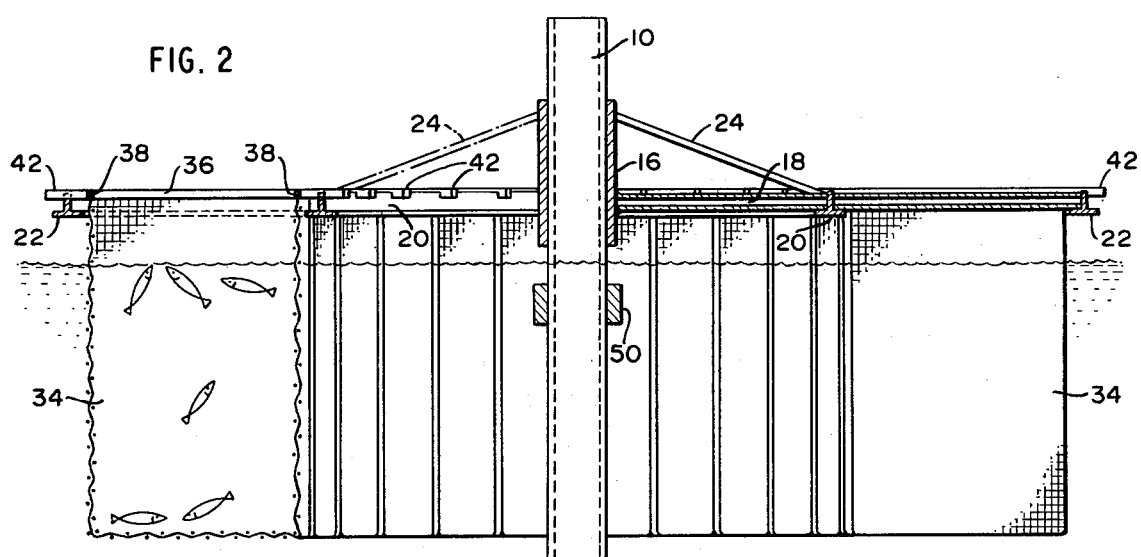
FIG. 2 is a view in side elevation taken along the line 2—2 of FIG. 1.

Having reference to FIGS. 1 and 2, a vertical shaft 10 of galvanized iron pipe or other strong material is imbedded in a concrete base 12 in the floor 14 of a fish pond. A sleeve 16 is fitted over the shaft 10 with sufficient clearance to permit rotation thereabout. Cross arms 18 which may be 2 inch galvanized pipe radiate outwardly from the sleeve 16 and are welded to an inner ring 20 and an outer concentric ring 22. Struts 24 between the sleeve 16 and the cross arms 18 are provided for additional support. Typical diameters for the inner ring 20 and outer ring 22 are respectively 5 feet and 10 feet. The ring and sleeve assembly is cut into quarter sections to facilitate transport, and each section is provided with flange and bolt devices 26 for rejoining at the fish pond. The rings should be coated with a rust inhibiting paint to prolong their useful lives.

Figure 3:
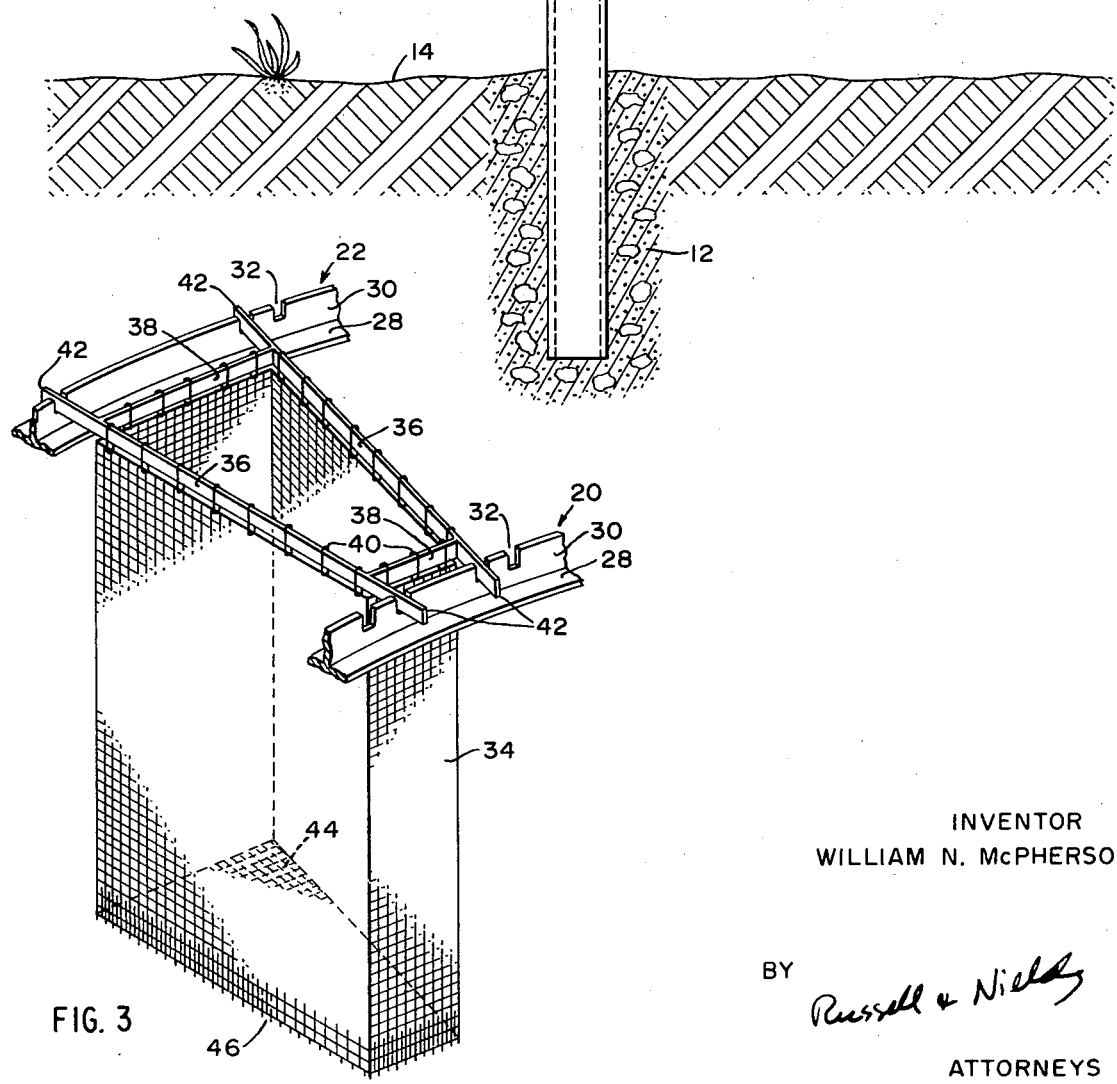
FIG. 3 is a view in perspective of a fish cage and frame engaged in a section of the support structure of this invention.

Referring now to FIG. 3, in a preferred embodiment both rings 20 and 22 are geometrically similar, differing only in over all dimension. Each has a flat horizontal base 28 and a vertical flange 30 arising from the central portion thereof. In cross-section the rings would appear as an inverted T. Radially aligned slots 32 are provided in the upper portion of the flanges 30. A plurality of wire mesh fish cages 34 are each mounted on rigid trapezoidal frames having two long side bars 36 and two parallel side bars 38 by means of a plurality of wire loops 40 passing through the top of the mesh and over the bars. The long side bars 36 extend beyond the parallel side bars 38 at each end, whereby the extended portions 42 may be inserted into the slots 32 and the frames supported between the concentric rings 20 and 22. In a preferred embodiment provision is made for 24 cages, a number that is highly desirable for purposes of statistical computation, but of course the structure may be designed for a different number of cages.

The cages 34 are water treated by dipping in a commercially available tar compound or the like. The mesh must be small enough to prevent escape of fish within, yet large enough to permit water flow through the cage without excessive resistance. ⅛ inch mesh has been used successfully for catfish fry, and ¼ inch mesh is permissible for catfish fingerlings. To avoid transferring growing fish from one cage to another a large mesh can be used with removable small mesh screens placed inside. The sides of the cage 34 are formed from a continuous piece of mesh bent to fit the frame, with a separate bottom piece 44. All ragged edges such as the bottom edge of the side portion 46 are kept on the outside of the cage 34 to avoid damage to the fish therein, and the bottom piece 44 overlaps the sides on the outside. The cages may be provided with lids to discourage predators and retain the fish should they dip under water. The lids should also be wire mesh, which transmits sunshine and offers little wind resistance.

In operation each fish cage 34 is mounted between the rings 20 and 22 and stocked with a particular group of fish to be segregated. Styrofoam blocks 48 are placed under the cross arms 18 to lift the tops of the cages above the surface. A collar 50 affixed to the vertical shaft 10 below the sleeve 16 keeps the cages off the pond floor 14 during periods of drainage. The cage and ring assembly is slowly rotated around the vertical shaft 10, either manually or with machine aid, at the rate of several revolutions a day. The fish in the various cages are thereby exposed to the same ambient conditions, eliminating the uncertainty caused by environmental factors entering into test results and enhancing the chances of producing a uniform commercial product.

Various modifications on the invention as described above will now become apparent to one skilled in the art, such as changes in the ring design or means for supporting the fish cages thereon. Accordingly, although generic terms have been used, they are meant in an illustrative sense, and no limitation is intended other than in terms of the appended claims.

I claim:

1. Apparatus for housing segregated groups of fish in a fish pond, comprising a plurality of water permeable fish enclosures circumscribing a central member, said central member immoveably imbedded in the floor of said fish pond and extending upwardly therefrom, means rotatable about said central member having means for detachably engaging said enclosures, and floatation means associated with said rotatable means.

2. Apparatus for housing segregated groups of fish in a fish pond, comprising a plurality of water permeable fish enclosures circumscribing a central vertical shaft, said shaft immoveably imbedded in the floor of said fish pond and extending upwardly therefrom, a sleeve girding a portion of said shaft and rotatable thereabout, a laterally spaced pair of rigid concentric rings held in fixed relationship to said sleeve and circumscribing said shaft, a frame associated with each of said enclosures, said frames positioned between said concentric rings and detachably engaged thereto, means associated with each of said frames for holding said associated enclosures, and floatation means associated with said concentric ring assembly.

3. The apparatus described in claim 2, wherein each of said concentric rings is comprised of a flat base having an upward tending flange with a plurality of slots in the upper portion of said flange, and wherein arms extend from each of said frames adapted for positioning within said slots.

4. A structure for holding a plurality of fish enclosures in a fish pond, comprising a vertical central shaft immoveably imbedded in the floor of said fish pond and extending upwardly therefrom, a sleeve girding a portion of said shaft and rotatable thereabout, a spoked wheel having an inner rim and an outer rim, said spokes converging upon and joined to said sleeve, said inner and outer rims having support means for holding a plurality of water permeable fish enclosures between said rims and said supports and floatation means associated with said wheel.

* * * * *